(12) United States Patent
Wang et al.

(10) Patent No.: US 7,690,720 B2
(45) Date of Patent: Apr. 6, 2010

(54) ENERGY ABSORBING VEHICLE HOOD ASSEMBLY WITH ASYMMETRIC SANDWICH INNER STRUCTURE

(75) Inventors: Jenne-Tai Wang, Rochester, MI (US); Bing Deng, Rochester Hills, MI (US); Qing Zhou, Beijing (CN); Qi Liu, Beijing (CN); Yong Xia, Beijing (CN)

(73) Assignee: GM Global Technology Operations, Inc., Detroit, MI (US)

( * ) Notice: Subject to any disclaimer, the term of this patent is extended or adjusted under 35 U.S.C. 154(b) by 139 days.

(21) Appl. No.: 12/023,568

(22) Filed: Jan. 31, 2008

(65) Prior Publication Data

US 2009/0195020 A1 Aug. 6, 2009

(51) Int. Cl.
*B62D 25/10* (2006.01)
(52) U.S. Cl. .............................. 296/193.11; 52/783.17; 52/783.19; 180/69.2
(58) Field of Classification Search .............. 52/783.14, 52/783.17, 783.19; 180/69.2, 69.21; 296/187.04, 296/187.09, 191, 193.09, 193.11, 203.02; 428/182
See application file for complete search history.

(56) References Cited

U.S. PATENT DOCUMENTS

| | | | | |
|---|---|---|---|---|
| 1,925,453 | A | * | 9/1933 | Mazer ......................... 181/290 |
| 3,094,350 | A | * | 6/1963 | Cusick ...................... 296/97.23 |
| 3,674,620 | A | * | 7/1972 | McCarthy et al. ............ 428/114 |
| 4,035,539 | A | * | 7/1977 | Luboshez ................... 428/178 |
| 4,097,958 | A | * | 7/1978 | Van Dell ....................... 16/225 |
| 4,136,630 | A | * | 1/1979 | Fraser .................... 114/102.27 |
| 4,598,008 | A | | 7/1986 | Vogt et al. |
| 4,886,696 | A | * | 12/1989 | Bainbridge ................. 428/184 |
| 5,182,158 | A | * | 1/1993 | Schaeffer .................... 428/178 |
| 5,290,622 | A | * | 3/1994 | Tanabe ........................ 428/182 |
| 5,682,667 | A | * | 11/1997 | Flagg ............................ 29/460 |
| 5,791,118 | A | * | 8/1998 | Jordan ...................... 52/783.11 |
| 6,179,364 | B1 | * | 1/2001 | Takahashi ..................... 296/76 |
| 6,290,272 | B1 | * | 9/2001 | Braun ......................... 293/120 |
| 6,939,599 | B2 | * | 9/2005 | Clark .......................... 428/178 |
| 7,399,028 | B1 | * | 7/2008 | Castillo et al. .......... 296/193.11 |
| 7,467,680 | B2 | * | 12/2008 | Mason ........................ 180/69.2 |

(Continued)

FOREIGN PATENT DOCUMENTS

GB 2186235 A * 8/1987

(Continued)

*Primary Examiner*—Glenn Dayoan
*Assistant Examiner*—Paul A Chenevert
(74) *Attorney, Agent, or Firm*—Quinn Law Group, PLLC

(57) ABSTRACT

An energy-absorbing hood assembly for a vehicle includes upper, lower, and middle panels. The upper and lower panels respectively include first and second interface surfaces. The upper panel is preferably secured to an inner surface of an outer panel. The middle panel has opposing first and second surfaces defining an asymmetric waveform profile, preferably having a polygonal geometry. The middle panel member is secured to the first and second interface surfaces at preselected locations along the upper and lower surfaces, thereby defining a plurality of laterally oriented asymmetric channels. The asymmetric waveform profile is configured with distinct amplitudes and wavelengths along different regions of the hood assembly, each configured to provide different predetermined levels of absorption and attenuation of kinetic energy imparted to the hood assembly by objects upon impact therebetween. Ideally, the lower and middle panels are respectively configured to controllably fail at first and second predetermined crush loads.

18 Claims, 2 Drawing Sheets

U.S. PATENT DOCUMENTS

| | | | |
|---|---|---|---|
| 7,488,031 B2 * | 2/2009 | Ishitobi | 296/193.11 |
| 7,497,507 B2 * | 3/2009 | Matsushima et al. | 296/187.04 |
| 2002/0003054 A1 * | 1/2002 | Kamada et al. | 180/69.2 |
| 2002/0189195 A1 * | 12/2002 | McKague et al. | 52/783.19 |
| 2003/0121710 A1 * | 7/2003 | Hamada et al. | 180/274 |
| 2005/0001453 A1 * | 1/2005 | Endo et al. | 296/193.11 |
| 2005/0023059 A1 * | 2/2005 | Kamada et al. | 180/69.21 |
| 2005/0057076 A1 * | 3/2005 | Roux et al. | 296/198 |
| 2006/0202492 A1 * | 9/2006 | Barvosa-Carter et al. | 293/107 |
| 2006/0220418 A1 * | 10/2006 | Behr et al. | 296/187.04 |
| 2007/0063544 A1 * | 3/2007 | Browne et al. | 296/187.09 |
| 2007/0132279 A1 * | 6/2007 | Donabedian et al. | 296/193.11 |
| 2008/0088154 A1 * | 4/2008 | Rocheblave et al. | 296/187.04 |
| 2008/0122261 A1 * | 5/2008 | Seo | 296/193.11 |
| 2008/0191518 A1 * | 8/2008 | Maruyama et al. | 296/203.02 |
| 2008/0315626 A1 * | 12/2008 | Lutter et al. | 296/187.04 |
| 2009/0025995 A1 * | 1/2009 | Wang et al. | 180/69.2 |
| 2009/0065277 A1 * | 3/2009 | Wang et al. | 180/69.2 |

FOREIGN PATENT DOCUMENTS

| | | | |
|---|---|---|---|
| JP | 54028373 A * | 3/1979 | |
| JP | 59156872 A * | 9/1984 | |
| JP | 61150824 A * | 7/1986 | |
| JP | 62026170 A * | 2/1987 | |
| JP | 62085767 A * | 4/1987 | |
| JP | 02208174 A * | 8/1990 | |
| JP | 03054079 A * | 3/1991 | |
| JP | 05278637 A * | 10/1993 | |
| KR | 1020030086418 A | 11/2003 | |
| KR | 1020070051772 A | 5/2007 | |
| KR | 1020070085595 A | 8/2007 | |

* cited by examiner

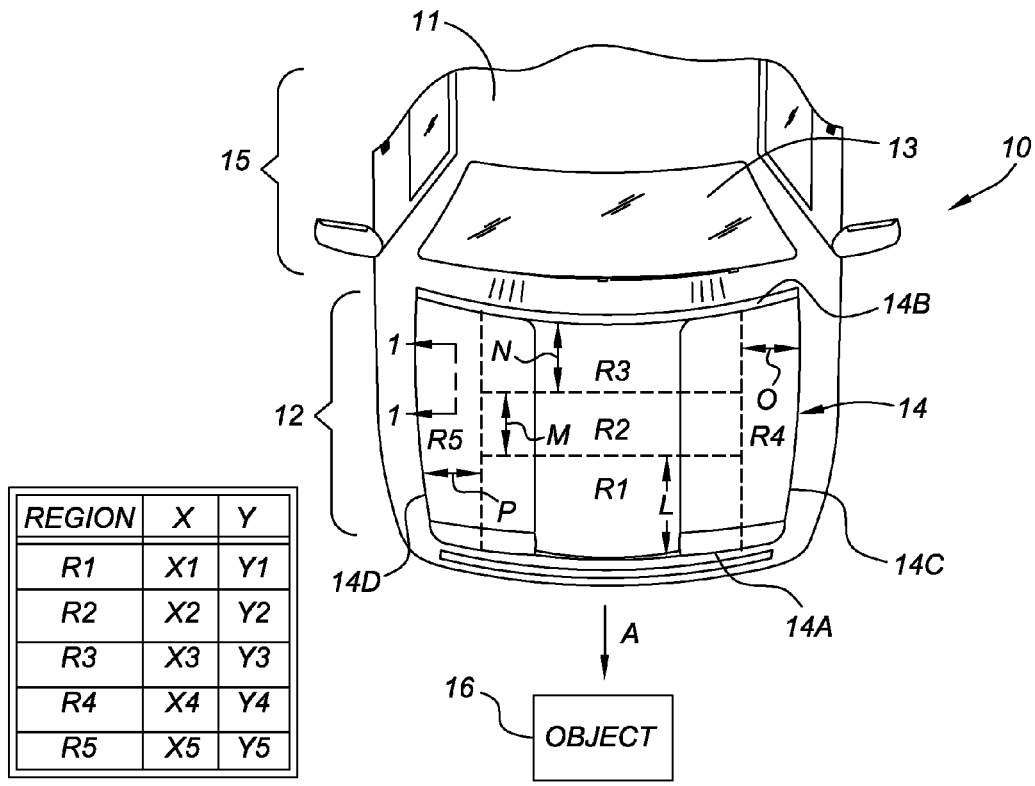
FIG. 1A
FIG. 1
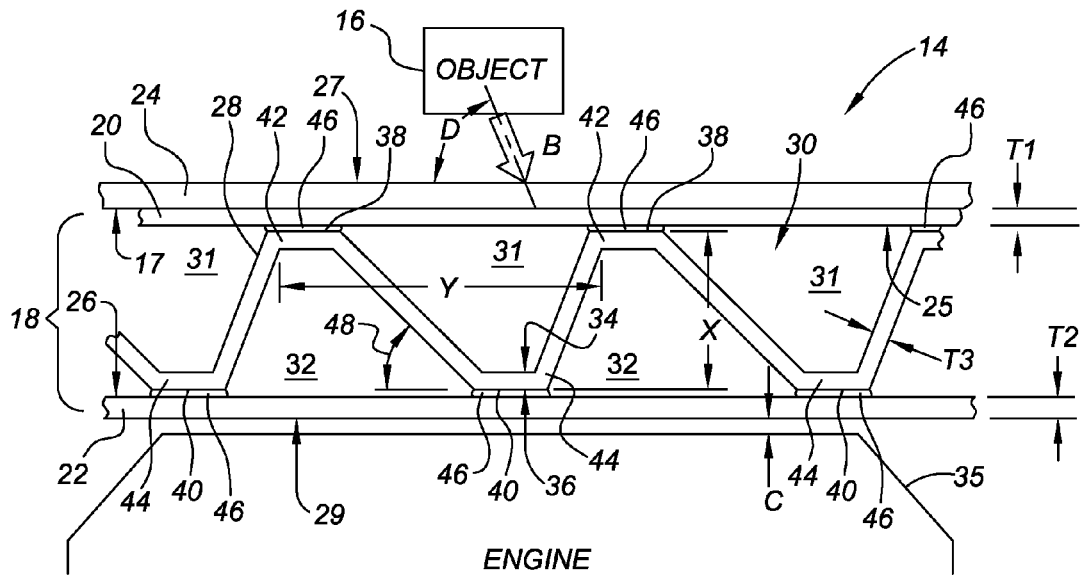
FIG. 2

ENERGY ABSORBING VEHICLE HOOD ASSEMBLY WITH ASYMMETRIC SANDWICH INNER STRUCTURE

TECHNICAL FIELD

The present invention relates generally to vehicle front structures, and more specifically to energy-absorbing engine compartment hoods for increasing the deceleration of an object upon impact therebetween, minimizing the required stopping distance of the object, and reducing resultant forces transmitted to the object by the engine compartment hood.

BACKGROUND OF THE INVENTION

Automotive vehicle bodies are typically constructed using stamped metal panels, which combine substantial overall strength and stiffness with a smooth, paintable exterior surface. With specific regard to vehicle hood panels (also referred to in the art as engine compartment hoods or bonnet structures), panel stiffness is often satisfied via the combination of a relatively high strength stamped metal outer or upper surface, referred to as an "A-surface", coupled with a preformed inner or lower surface, referred to as a "B-surface", supported by a series of engine-side or hat-section reinforcements. The hat-section reinforcements are typically positioned between the A- and B-surfaces of the hood, and include a pair of upper flanges oriented toward the A-surface as well as a single lower flange oriented toward the B-surface, with the upper and lower flanges interconnected by a web portion. This conventional hood construction increases the bending stiffness of the hood by placing relatively stiff material, usually stamped steel, as far away as possible from the neutral axis of bending of the hood.

In certain vehicle impact scenarios, an object may exert a downward force on the vehicle hood. Typically, vehicle hoods are deformable when a downward force is exerted thereto. However, the deformability of the hood and, correspondingly, the hood's ability to absorb energy may be impeded by the proximity of the hood to rigidly mounted components housed in the vehicle's engine (or forward) compartment. By way of example, the hood's ability to absorb energy through deformation can be significantly impeded where the hood and engine block are in close proximity. However, minimal clearance between the vehicle hood and the engine compartment components may provide significant benefits, such as improved driver visibility, increased aerodynamics, and additional aesthetic appeal.

In contrast, additional clearance between the vehicle hood and engine compartment can increase the hood's ability to absorb energy when acted upon with a downward force. Therefore, notwithstanding other design concerns, it can also be advantageous to increase the clearance between the vehicle hood and the components housed in the engine compartment.

SUMMARY OF THE INVENTION

The energy-absorbing hood assemblies with asymmetric sandwich inner structure of the present invention offer improved crush performance and more uniform kinetic energy absorption and attenuation. The improved and more uniform crush characteristics of the present hood assembly ensure a compliant surface when subjected to a crush load upon impact with a foreign object. As such, the present design maximizes the hood assembly's ability to absorb and attenuate kinetic energy imparted thereto, and thereby minimize the required stopping distance of the object. In addition, the orientation, regional variation, and design of the asymmetric sandwich inner structure offers "tunable" crush characteristics for varying impact scenarios. The hood assembly of the present design also provides a relatively high bending stiffness, enabling sufficient rigidity and stability when the vehicle is in normal operation, rendering the present hood assembly resistant to flutter or shake dynamics that may occur at high vehicle speeds, and sufficiently resilient to meet standard performance requirements.

According to one embodiment of the present invention, an energy-absorbing hood assembly is provided for use with a vehicle. The vehicle hood assembly includes upper, lower, and middle panel members, each preferably made from either a metallic material or a brittle plastic. The upper panel member has a first interface surface, whereas the lower panel member has a second interface surface. The middle panel has opposing first and second surfaces defining an asymmetric, preferably polygonal waveform profile, which propagates longitudinally with respect to the vehicle. A hood outer panel may also be included, wherein the upper panel member is operatively attached to an inner surface of the hood outer panel.

As used herein, the terms "asymmetric" and "asymmetrical" should be defined or interpreted as identifying a component or element with a geometric profile that is not identical on both sides of a dividing centerline line or plane. Similarly, the term "waveform", as used herein, should be defined or interpreted to mean a repeating, propagating geometric shape having a plurality of peaks and valleys, and a corresponding amplitude and wavelength.

The middle panel member is mounted, secured, or attached to the upper and lower panel members. Specifically, the middle panel member attaches (e.g., via adhesives) at preselected locations along the upper and lower surfaces to the first and second interface surfaces, thereby defining a plurality of asymmetric channels oriented laterally with respect to the vehicle. Ideally, the upper surface defines a first plurality of bonding surfaces, each oriented along a respective peak of the asymmetric waveform profile, whereas the lower surface defines a second plurality of bonding surfaces, each oriented along a respective valley of the asymmetric waveform profile. Accordingly, the middle panel member is attached to the first and second interface surfaces along the first and second pluralities of bonding surfaces, respectively.

In one aspect of the invention, the asymmetric waveform profile has a first amplitude and wavelength along a first region of the hood assembly. The first amplitude and wavelength are configured to provide a first predetermined level of absorption and attenuation of kinetic energy imparted to the hood assembly by objects upon impact therebetween. In a similar regard, each propagation of the asymmetric waveform profile preferably has at least one acute angle that is selectively configured to provide predetermined crush characteristics of the middle panel layer.

In another aspect of the invention, the asymmetric waveform profile also has a second amplitude and wavelength along a second region of the hood assembly, where the second region is different from the first region. The second amplitude and wavelength are each configured to provide a second predetermined level of absorption and attenuation of kinetic energy imparted to the hood assembly by objects upon impact therebetween.

In yet another aspect of the invention, the asymmetric waveform profile further includes a variable height and wavelength along a third region of the hood assembly, preferably forming a transition region between the first and second regions—e.g., providing a gradual evolution from a relatively smaller amplitude and wavelength of the first region to a relatively larger amplitude and wavelength of the second region. Ideally, the variable amplitude and wavelength are configured to vary levels of absorption and attenuation of kinetic energy imparted to the hood assembly by objects upon impact therebetween throughout the third region.

According to yet another aspect of the invention, the lower panel member is configured to controllably deform or fail at a predetermined threshold crush load imparted to the hood assembly by objects upon impact therebetween. Similarly, the middle panel member is also configured to controllably deform or fail at a predetermined threshold crush load imparted to the hood assembly by objects upon impact therebetween. The two panel members, i.e., the middle and lower panel members, can be configured to controllably deform or fail through the addition of precuts or inclusions thereto.

According to another embodiment of the present invention, a vehicle is provided having vehicle structure defining a front compartment at a forward end thereof. The vehicle includes a hood assembly attached to the vehicle structure, preferably in a rotatable manner, and configured to extend over and above the vehicle front compartment. The hood assembly comprises an upper panel member having a first interface surface, and a lower panel member having a second interface surface. A middle panel member is also included. The middle panel member has substantially opposing upper and lower surfaces defining an asymmetric trapezoidal waveform profile. The upper surface defines a first plurality of bonding surfaces, each oriented along a respective peak of the waveform profile, whereas the lower surface defines a second plurality of bonding surfaces, each oriented along a respective valley of the waveform profile. The first plurality of bonding surfaces is secured, adhered, or attached to the first interface surface to thereby define a first plurality of asymmetric trapezoidal channels oriented laterally with respect to the vehicle. Likewise, the second plurality of bonding surfaces is secured, adhered, or attached to the second interface surface to thereby define a second plurality of asymmetric trapezoidal channels oriented laterally with respect to the vehicle.

According to yet another embodiment of the present invention, an energy-absorbing hood assembly is provided for use with a motorized vehicle having vehicle structure with opposing forward and rearward ends. The hood assembly is attached to the vehicle structure in any known manner proximate to the forward end thereof. The hood assembly includes an upper panel member having a first interface surface, a lower panel member having a second interface surface, and a middle panel member having substantially opposing upper and lower surfaces defining an asymmetric trapezoidal waveform profile. The upper surface defines a first plurality of bonding surfaces, each oriented along a respective peak of the waveform profile. The lower surface defines a second plurality of bonding surfaces, each oriented along a respective valley of the waveform profile. The first plurality of bonding surfaces is attached to the first interface surface to thereby define a first plurality of laterally oriented asymmetric trapezoidal channels. Similarly, the second plurality of bonding surfaces is operatively attached to the second interface surface to thereby define a second plurality of laterally oriented asymmetric trapezoidal channels. The upper panel member is operatively attached to the inner surface of a hood outer panel.

The asymmetric trapezoidal waveform profile has a first amplitude and wavelength along a first region of the hood assembly, a second amplitude and wavelength along a second region of the hood assembly, and a third amplitude and wavelength along a third region of the hood assembly. Each of the first, second, and third amplitudes and wavelengths are respectively configured to provide first, second, and third predetermined levels of absorption and attenuation of kinetic energy imparted to the hood assembly by objects upon impact therebetween throughout their individual regions.

The above features and advantages, and other features and advantages of the present invention will be readily apparent from the following detailed description of the preferred embodiments and best modes for carrying out the present invention when taken in connection with the accompanying drawings.

BRIEF DESCRIPTION OF THE DRAWINGS

FIG. 1 is a plan perspective view showing a representative motor vehicle having mounted thereto an energy-absorbing hood assembly with asymmetric sandwich inner structure in accordance with the present invention;

FIG. 1A is a chart provided to show the regional variation of the amplitude and wavelength of the asymmetric sandwich inner structure of FIG. 1 in accordance with a preferred embodiment of the present invention;

FIG. 2 is a side-schematic view taken along line 1-1 of FIG. 1 illustrating the energy-absorbing hood assembly with asymmetric sandwich inner structure in accordance with a preferred embodiment of the present invention;

DESCRIPTION OF THE PREFERRED EMBODIMENTS

Figure 2A:
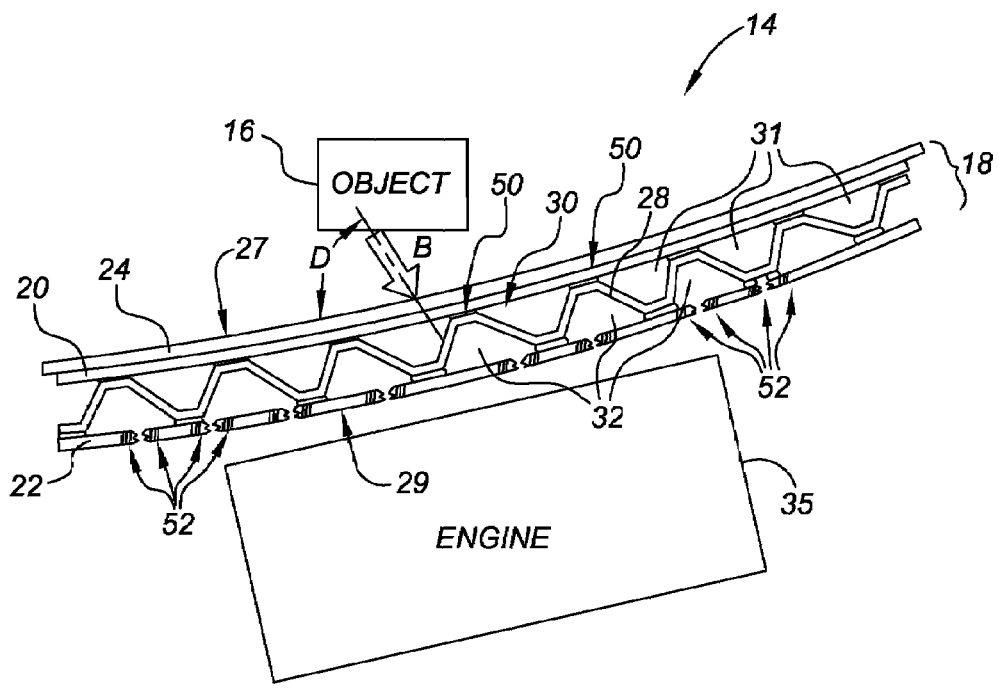
FIG. 2A is a representative side-schematic illustration depicting the energy-absorbing hood assembly of FIG. 2 upon initial impact with an object provided to show controlled deformation and failure of the lower panel member.

Referring to the Figures, wherein like reference numbers refer to like components throughout the several views, FIG. 1 is a plan view of an exemplary motor vehicle, identified generally as 10, for use of the present invention. FIG. 1 is provided merely for explanatory purposes, representing application of the present invention in a simplified illustration, the dimensions thereof exaggerated for clarity and for a better understanding of the present invention. As such, the present invention is by no means limited to the particular structure or layout presented therein. Correspondingly, although the vehicle 10 is depicted in FIG. 1 as a standard coupe-type passenger car, the energy-absorbing hood assemblies of the present invention can be incorporated into any vehicle platform (e.g., sedan-type passenger cars, light trucks, heavy duty vehicles, buses, vans, etc.)

The motor vehicle 10 has a vehicle body 11 (also referred to herein as "vehicle structure") that includes a moveable or actuatable energy-absorbing vehicle hood assembly (hereinafter "hood assembly 14") spanning or covering an engine compartment 12 forward of a passenger compartment 15. The hood assembly 14 is attached, secured, or mounted to the vehicle body 11, for example, by one or more peripheral hinges (not shown) positioned adjacent to a windshield 13. It is desirable that the hood assembly 14 is sufficiently sized and shaped to provide a closure panel suitable for substantially covering and protecting various vehicular components contained within the engine compartment 12, which may include, but is not limited to, propulsion system components, steering system components, braking system components, and heating, ventilation, and air conditioning (HVAC) system components, all of which are represented collectively herein as engine 35, as seen in FIGS. 2-2B. The term "engine" or "engine compartment" is not considered limiting with respect to the nature or type of propulsion system employed by the vehicle 10. Thus, within the scope of the claimed invention, the vehicle 10 may employ any propulsion system, such as a conventional internal combustion engine, an electric motor, a fuel cell, a hybrid-electric system, etc. As represented in FIG. 1, vehicle 10 may move or travel in the direction of arrow A toward an object 16, positioned external to vehicle 10, in such a manner that the object 16 impacts the hood assembly 14 in a substantially downward direction during a collision therebetween, thereby subjecting the hood assembly 14 to various stresses, forces, and/or loads, as described hereinbelow with reference to FIGS. 2-2B.

Turning to FIG. 2, a representative side view illustration of the hood assembly 14, taken along line 1-1 of FIG. 1, is provided to show the asymmetric inner sandwich structure 18 (hereinafter referred to as the "sandwich structure") according to a preferred embodiment of the present invention. The sandwich structure 18 consists of three primary elements—an upper panel member or outer layer 20, a lower panel member or inner layer 22, and a middle panel member or middle layer 28 therebetween. The lower panel member 22, intended as the inner-most member, includes an engine-side surface or "B-surface" 29. The upper panel member 20 is attached, secured, or adhered to an inner surface 17 of a hood outer panel 24, e.g. by adhesive, fastening, or welding. The hood outer panel 24 also includes an outermost, customer-visible "A-surface" 27. Alternatively, the hood outer panel 24 can be eliminated outright, or preformed with the upper panel member 20 into a single, unitary member without departing from the scope of the present invention. The sandwich structure 18 preferably extends so as to cover substantially the entire inner surface 17 of the hood outer panel 24. On the other hand, the sandwich structure 18 can be fabricated and secured in such a manner so as to cover only certain portions of the inner surface 17 of the hood outer panel 24.

The sandwich structure 18 may be fabricated entirely from metal, entirely from plastic, or a combination thereof. For example, the upper and lower panel members 20, 22 may be fabricated from a brittle plastic, such as, but not limited to, Polymethyl methacrylate (PMMA) or bulk mold compound (BMC), of approximately 0.3 to 2.8 millimeters in thickness T1, T2, respectively. Alternatively, the upper and lower panel members 20, 22 may be fabricated from a metal material, such as, but not limited to, cold rolled steel, hot dipped galvanized steel, stainless steel, aluminum, and the like, of approximately 0.3 to 1.5 millimeters in thickness T1, T2. However, other values for the thickness T1 of the upper panel member 20, and T2 of the lower panel member 22 may be usable within the scope of the present invention.

Ideally, the upper and lower panel members 20, 22 are one-piece plates, preferably preformed using such methods as stamping, hydroforming, quick plastic forming, or superplastic forming. It is further preferred that the upper and lower panel members 20, 22 be individually contoured to meet predetermined packaging, design, and assembly restrictions. By way of example, the upper panel member 20 is desirably preformed with contours for aesthetic appeal and/or for improved bonding to the inner surface 17 of the hood outer panel 24, while the lower panel member 22 is preformed with differing geometric parameters (e.g., contours and dimensions) for packaging limitations at different locations. In the alternative, it is also within the scope of the claimed invention that the upper and lower panel members 20, 22 each consists of multiple plate members, include rounded or beveled edges and corners, have identical geometric configurations, and/or have complementary profiles.

Referring still to FIG. 2, the middle panel member 28 has substantially opposing upper and lower surfaces 34 and 36, respectively, which define an asymmetric waveform profile, indicated generally by 30 and referred to hereinafter as "waveform profile", as will be described in further detail hereinbelow. First 38 and second 40 pluralities of bonding surfaces are respectively defined along the various crests (represented collectively in FIG. 2 by peaks 42) and hollows (represented collectively in FIG. 2 by valleys 44).

The middle panel member 28 is secured, preferably by an adhesive 46, to a first interface surface 25 of the upper panel member 20 via the first plurality of bonding surfaces 38 to form a first plurality of asymmetric channels 31, oriented laterally relative to the vehicle body 11 (e.g., generally perpendicular to right lateral edge 14C of the hood assembly 14). The middle panel member 28 is also secured, preferably by an adhesive 46, to a second interface surface 26 of the lower panel member 22 via the second plurality of bonding surfaces 40, forming a second plurality of asymmetric channels 32, oriented laterally relative to the vehicle body 11 (e.g., generally perpendicular to right lateral edge 14C of the hood assembly 14). Alternatively, the entire sandwich structure 18 (i.e., upper 20, lower 22, and middle 28 panel members) can be manufactured by extrusion or other molding method in mass production, thereby eliminating the need for the first and second pluralities of bonding surfaces 38, 40 and adhesive 46.

Ideally, the middle panel member 28 is a one-piece plate of the same overall length and width as the upper and lower panel members 20, 22, preferably preformed using such methods as stamping, hydroforming, quick plastic forming, or superplastic forming. It is further preferred that the middle panel member 28 is fabricated from a material known to have a suitable strength for the intended use of the hood assembly 14. For example, the middle panel member 28 may be fabricated from a plastic polymer (e.g., PMMA or BMC), of approximately 1.1 to 1.9 millimeters in thickness T3, or metal (e.g., cold rolled steel, hot dipped galvanized steel, stainless steel, aluminum, and the like), of approximately 0.5 to 1.9 millimeters in thickness T3. The middle panel member 28 may be finished with an anti-corrosive, highly durable coating (e.g., zinc plating). It is also within the scope of the present invention that the middle panel member 28 consists of multiple panels, each taking on similar or distinct geometric profiles (as described below with respect to FIG. 1), and include rounded or beveled edges and corners. A compressible, energy-absorbing foam material (not shown), such as polyurethane foam, polystyrene foam, and other similar materials or combinations thereof, may be utilized to fill the first and second pluralities of asymmetric channels 31, 32.

According to the embodiment of FIG. 2, the upper and lower surfaces 34, 36 of the middle panel member 28 define waveform profile 30, preferably having an asymmetric polygonal or trapezoidal geometry. As used herein, the terms "asymmetric" and "asymmetrical" should be defined or interpreted as identifying a component or element with a geometric profile that is not identical on both sides of a dividing centerline line or plane. Similarly, the term "waveform", as used herein, should be defined or interpreted to mean a repeating, propagating geometric shape having a plurality of peaks and valleys, and corresponding amplitude and wavelength. As shown in FIG. 2, the amplitude X is a metric of the vertical distance from a peak 42 to a preceding or subsequent valley 44, representing the sum-total magnitude of propagation of the waveform profile 30. Likewise, the wavelength Y is shown in FIG. 2 as the distance between repeating units of the waveform profile 30.

The sandwich structure 18 has various structural characteristics, including, but not limited to, geometric characteristics—such as thicknesses T1-T3, amplitude X, wavelength Y, and acute angle 48, and material characteristics—such as elastic modulus, yield strength, and density, which may be selectively manipulated to provide a predetermined or "tunable" and substantially constant or uniform "crush performance" for a given threshold crush load. More specifically, with reference to FIG. 2, as the object 16 impacts the A-surface 27 of the hood outer panel 24 (or upper panel member 20, depending upon the particular configuration), the actual and relative mass, velocity, and acceleration of object 16 and vehicle 10 (see FIG. 1) combine to generate a crush load (represented generally by arrow B) in a generally downward direction, e.g., at an angle D (see FIG. 2). The crush load B therefore is directed from the upper panel member 20 toward the lower panel member 22 through the middle panel member 28, and has a specific magnitude. Each of the respective panel members 20, 22, and 28 may be independently engineered, by virtue of their individual structural characteristics—i.e., geometric and material characteristics, to have relatively high tensile and compressive strength or stiffness, providing a preferred performance, while still maintaining a relatively low failure or threshold crush strength permitting a particular failure response or "crush performance" when the hood assembly 14 is subjected to crush load B, i.e. when the crush load B exceeds the threshold crush strength of upper panel member 20. Ideally, the threshold crush strength is set at a level sufficient to permit contact with various small stones, hail, minor debris, or other such representative objects commonly encountered during ordinary roadway operation, to enable the hood assembly 14 to be utilized in a wide range of driving conditions without fracturing or failing. The waveform profile 30 has at least one acute angle 48 at each propagation that is selectively configured to provide predetermined crush characteristics of said middle panel layer.

According to the embodiment of FIGS. 1 and 2, the hood assembly 14 is broken up into as few as two, but preferably five independent regions R1-R5, respectively. The first R1, second R2, and third R3 regions dissect the hood assembly 14 into a forward region, a middle region, and a rearward region, respectively. In other words, the first region R1 extends rearward from a forward edge 14A of the hood assembly 14 to a distance L along the vehicle body 11. In addition, the second region R2 extends from the distance L rearward along the vehicle body 11 a further distance M. The third region R3 extends rearward from the second region R2 (i.e., a distance L+M from the forward edge 14A of the hood assembly 14) a distance N to a rearward edge 14B of the hood assembly 14, as depicted in FIG. 1. The fourth R4 and fifth R5 regions, if included, further dissect the hood assembly 14 into one or more lateral segments. For example, the fourth region R4 extends inward a distance O from a right lateral edge 14C of the hood assembly 14, whereas the fifth region R5 extends inward a distance P from a left lateral edge 14D, also illustrated in FIG. 1. Notably, the dimensions shown in FIG. 1 for regions R1 through R5 are merely exemplary and provided for descriptive purposes. Therefore, the length and width of the five hood panel regions R1-R5 may vary infinitely. Furthermore, a single region may be utilized or more than five regions may be employed, each having identical or differing geometric configurations, without departing from the scope of the claimed invention.

According to a preferred embodiment of the present invention, the sandwich structure 18 is optimized for each respective region R1-R5 independently of the other for impact with objects of varying dimensions, masses, velocities, etc. Specifically, waveform profile 30 has a first amplitude X1 and wavelength Y1 throughout the first region R1 of the hood assembly 14, as shown in FIG. 1A. Similarly, the waveform profile 30 also has a second amplitude X2 and wavelength Y2 throughout the second region R2 of the hood assembly 14, a third amplitude X3 and wavelength Y3 throughout the third region R3 of the hood assembly 14, a fourth amplitude X4 and wavelength Y4 throughout the fourth region R4 of the hood assembly 14, and a fifth amplitude X5 and wavelength Y5 throughout the fifth region R5 of the hood assembly 14. Each of the first, second, third, fourth and fifth amplitudes X1-X5 and wavelengths Y1-Y5 are respectively configured to provide different predetermined levels of absorption and attenuation of kinetic energy imparted to the hood assembly by objects, such as object 16, upon impact therebetween throughout their individual regions R1-R5.

Optimally, the first region R1 has an amplitude X1 and wavelength Y1 that are respectively smaller than the amplitude X3 and wavelength Y3 of the third region R3. In this particular instance, the amplitude X2 and wavelength Y2 of the second region R2 are preferably variable, forming a transition region between the first and third regions R1, R3—providing a gradual evolution from the smaller amplitude X1 and wavelength Y1 of the first region R1 to the larger amplitude X3 and wavelength Y3 of the third region R3. Furthermore, the fourth and fifth regions R4 and R5 preferably have no sandwich structure 18 (e.g., X4, X5, Y4, Y5=0), but rather provide a smooth transition from the regions R1-R3—e.g., wherein the upper panel member 20 curves with the hood outer panel 24 toward the right and left lateral edges 14C, 14D. However, this particular configuration may be changed or altered without departing from the intended scope of the present invention.

Still referring to FIGS. 1 and 2, the sandwich inner structure 18 is configured, as described above, to provide sufficient initial stiffness together with the hood outer panel 24 to generate a large initial deceleration as soon and high as possible upon impact with object 16. The sandwich inner structure 18, together with adhesive 64, acts as an added, uniformly-distributed mass to the hood assembly 14, the inertial effect of such added mass promoting deceleration of the object 16 in the early stages of the vehicle-object collision.

Figure 2B:
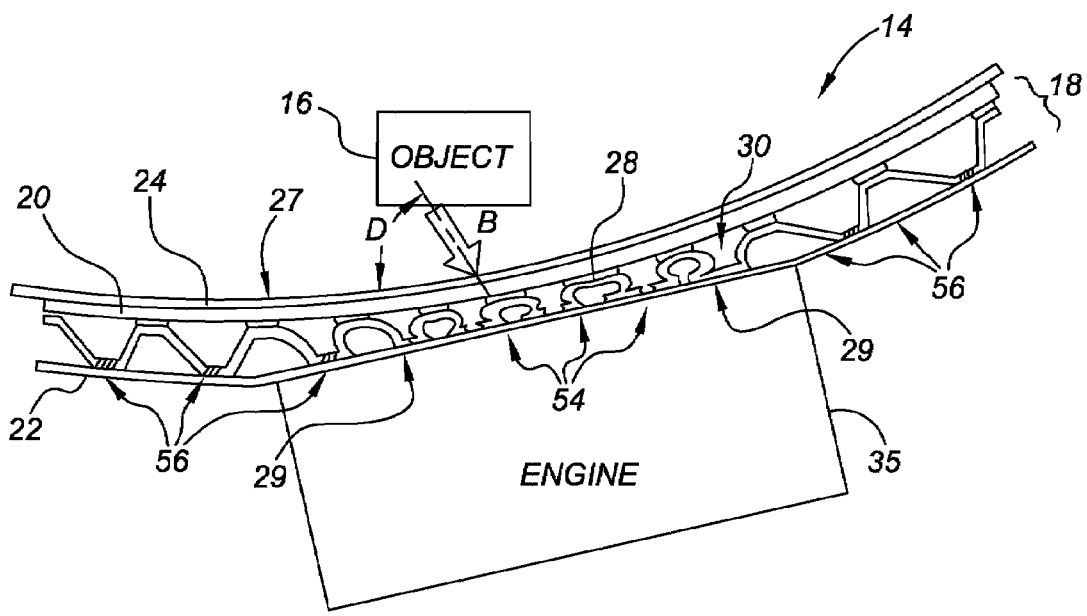
FIG. 2B is a representative side-schematic illustration depicting the hood assembly of FIG. 2 shortly after initial impact with an object provided to show controlled deformation and failure of the asymmetric middle panel member.

FIG. 2A is a side-schematic illustration depicting the energy-absorbing hood assembly of FIG. 2 upon initial impact with object 16, provided to show controlled deformation and, eventually, failure of the lower panel member 22. Specifically, the sandwich structure 18, besides adding to the initial stiffness of the hood assembly 14, is designed to trigger local deformation and rupture, in a controlled and precalculated manner, of the lower panel member 22 during the initial impact of the object 16 with the hood assembly 14. For example, deformation of the hood outer panel 24 during collision with an object 16 may induce a deliberate breakdown of the adhesive 46 (depicted generally at 50) holding the middle panel member 28 to the outer panel member 20 or the sandwich structure 18 to the hood outer panel 24. The sandwich structure 18 is designed to thereafter trigger local deformation (e.g., bending, buckling, or compression) and/or rupture (e.g., controlled fracturing) of the lower panel member 22 (depicted symbolically in FIG. 2A by the fractured lower panel member 22) at a first predetermined threshold crush load resulting from the impact of the object 16 with the hood assembly 14.

The separation of the sandwich structure 18 from the hood outer panel 24 and the local rupture of the lower panel member 22 can selectively and controllably reduce the local and global stiffness of the hood assembly 14, resulting in increased absorption of kinetic energy transferred from the object 16 to the hood assembly 14, thereby maximizing any consumed under-hood space, e.g., reducing the clearance C of FIG. 2 between the engine 35 and B-surface 29 required to stop the object 16. Failure of the lower panel member 22 can be manipulated by, for example, the addition of pre-cuts or inclusions thereto, depicted collectively by reference numeral 52. In addition, the angle of each propagation relative to the upper and lower panel members 20, 22 i.e., angle 48 of FIG. 2, can be modified to effectuate different modes of deformation, e.g., buckling, bending, stretching, and combinations thereof.

Referring to FIG. 2B, when the object 16 presses downwards, e.g., at an angle D, the hood assembly 14, namely B-surface 29 of the lower panel member 22, may contact one or more of the under-hood components, such as engine 35. The middle panel member 28 serves as padding in the form of local deformation of one or more propagation in the waveform profile 30, absorbing residual kinetic energy from the object 16 upon impact with the under-hood components. By way of example, the middle panel member 28 is designed (e.g., through manipulation of the structural characteristics described above) to controllably compress at a second threshold crush load upon contact with any of the various under-hood components (e.g., engine 35), as illustrated in FIG. 2B. The sandwich structure 18 may also be configured to trigger local rupture of the middle panel member 28 (depicted symbolically in FIG. 2B by fractures 54). Deformation and rupture of the middle panel member 28 can be manipulated by, for example, the addition of pre-cuts or inclusions thereto, identified collectively at 56 in FIG. 2B. In effect, the opposing force imparted to the object 16 by the hood assembly 14 upon a collision therebetween is relatively less variable, and provides a larger initial attenuation of kinetic energy resulting in a reduced residual velocity. This in turn reduces the total distance required for the hood assembly 14 to fully absorb the energy from such a collision and bring the object 16 to a complete stop, thereby minimizing or eliminating contact between the object 16 and any under-hood components (e.g., engine 35).

While the best modes for carrying out the invention have been described in detail, those familiar with the art to which this invention relates will recognize various alternative designs and embodiments for practicing the invention within the scope of the appended claims.

The invention claimed is:

1. An energy-absorbing hood assembly for use with a vehicle, comprising:
   an upper panel member having a first interface surface;
   a lower panel member having a second interface surface; and
   a middle panel member having substantially opposing upper and lower surfaces defining an asymmetric waveform profile propagating longitudinally with respect to the vehicle;
   wherein said middle panel member is respectively operatively attached to said first and second interface surfaces at preselected locations along said upper and lower surfaces to thereby define a plurality of asymmetric channels oriented laterally with respect to said vehicle; and
   wherein said asymmetric waveform profile is an asymmetrical polygonal waveform profile.

2. The hood assembly of claim 1, wherein said upper surface defines a first plurality of bonding surfaces each oriented along a respective peak of said asymmetric waveform profile, and said lower surface defines a second plurality of bonding surfaces each oriented along a respective valley of said asymmetric waveform profile;
   wherein said middle panel member is respectively operatively attached to said first and second interface surfaces at said first and second pluralities of bonding surfaces.

3. The hood assembly of claim 1, wherein each propagation of said asymmetric waveform profile has at least one acute angle that is selectively configured to provide predetermined crush characteristics of said middle panel layer.

4. The hood assembly of claim 1, further comprising:
   a hood outer panel having an inner surface, wherein said upper panel member is operatively attached to said inner surface of said hood outer panel.

5. The hood assembly of claim 1, wherein said upper, middle, and lower panel members are each made from one of a metallic material and a brittle plastic.

6. The hood assembly of claim 1, wherein said lower panel member is configured to controllably fail at a predetermined threshold crush load imparted to the hood assembly by objects upon impact therebetween.

7. The hood assembly of claim 6, wherein said lower panel member is configured to controllably deform or fail at said predetermined threshold crush load via the addition of pre-cuts or inclusions thereto.

8. The hood assembly of claim 1, wherein said middle panel member is configured to controllably deform or fail at a predetermined threshold crush load imparted to the hood assembly by objects upon impact therebetween.

9. The hood assembly of claim 8, wherein said middle panel member is configured to controllably fail at said predetermined threshold crush load via the addition of precuts or inclusions thereto.

10. The hood assembly of claim 1, wherein said asymmetric waveform profile has a first amplitude and a first wavelength along a first region of the hood assembly, said first amplitude and wavelength each being configured to provide a first predetermined level of absorption and attenuation of kinetic energy imparted to the hood assembly by objects upon impact therebetween.

11. The hood assembly of claim 10, wherein said asymmetric waveform profile has a second amplitude and a second wavelength along a second region of the hood assembly different from said first region, said second amplitude and wavelength each being configured to provide a second predetermined level of absorption and attenuation of kinetic energy imparted to the hood assembly by objects upon impact therebetween.

12. The hood assembly of claim 11, wherein said asymmetric waveform profile has a variable amplitude and wavelength along a third region of the hood assembly different from said first and second regions, said variable amplitude and wavelength configured to vary levels of absorption and attenuation of kinetic energy imparted to the hood assembly by objects upon impact therebetween throughout said third region.

13. A vehicle having vehicle structure defining a front compartment at a forward end thereof, the vehicle comprising:
   a hood assembly operatively attached to the vehicle structure and configured to extend over and above the vehicle front compartment, said hood assembly including:
   an upper panel member having a first interface surface;

a lower panel member having a second interface surface; and a middle panel member having substantially opposing upper and lower surfaces defining an asymmetric trapezoidal waveform profile propagating longitudinally with respect to the vehicle;

wherein said upper surface defines a first plurality of bonding surfaces each oriented along a respective peak of said asymmetric waveform profile, and said lower surface defines a second plurality of bonding surfaces each oriented along a respective valley of said asymmetric waveform profile;

wherein said first plurality of bonding surfaces is operatively attached to said first interface surface to thereby define a first plurality of asymmetric trapezoidal channels oriented laterally with respect to the vehicle; and wherein said second plurality of bonding surfaces is operatively attached to said second interface surface to thereby define a second plurality of asymmetric trapezoidal channels oriented laterally with respect to the vehicle; and wherein said asymmetric waveform profile has a first amplitude and wavelength along a first region of the hood assembly and a second amplitude and wavelength along a second region of the hood assembly different from said first region, said first and second amplitudes and wavelengths being respectively configured to provide first and second predetermined levels of absorption and attenuation of kinetic energy imparted to the hood assembly by objects upon impact therebetween.

14. The vehicle of claim 13, wherein said asymmetric waveform profile has a third amplitude and wavelength along a third region of the hood assembly different from said first and second regions, said third amplitude and wavelength each being configured to provide a third predetermined level of absorption and attenuation of kinetic energy imparted to the hood assembly by objects upon impact therebetween.

15. The vehicle of claim 14, wherein said asymmetric waveform profile has a variable amplitude and wavelength along a fourth region of the hood assembly different from said first, second, and third regions, said variable amplitude and wavelength configured to vary levels of absorption and attenuation of kinetic energy imparted to the hood assembly by objects upon impact therebetween throughout said fourth region.

16. The vehicle of claim 15, wherein said lower and middle panel members are respectively configured to controllably fail at first and second predetermined threshold crush loads imparted to the hood assembly by objects upon impact therebetween.

17. The hood assembly of claim 16, wherein each propagation of said asymmetric waveform profile has at least one acute angle that is selectively configured to provide predetermined crush characteristics of said middle panel layer.

18. An energy-absorbing hood assembly for use with a motorized vehicle having vehicle structure with opposing forward and rearward ends, the hood assembly being operatively attached to the vehicle structure proximate to the forward end, comprising:

an upper panel member having a first interface surface;

a lower panel member having a second interface surface;

a middle panel member having substantially opposing upper and lower surfaces defining an asymmetric trapezoidal waveform profile, said upper surface further defining a first plurality of bonding surfaces each oriented along a respective peak of said waveform profile, and said lower surface further defining a second plurality of bonding surfaces each oriented along a respective valley of said waveform profile; and a hood outer panel having an inner surface, wherein said upper panel member is operatively attached to said inner surface of said hood outer panel;

wherein said first plurality of bonding surfaces is operatively attached to said first interface surface to thereby define a first plurality of asymmetric trapezoidal channels oriented laterally with respect to said vehicle;

wherein said second plurality of bonding surfaces is operatively attached to said second interface surface to thereby define a second plurality of asymmetric trapezoidal channels oriented laterally with respect to said vehicle; and wherein said waveform profile has a first, a second, and a third amplitude and wavelength along respective first, second, and third regions of the hood assembly, said first, second, and third amplitudes and wavelengths being respectively configured to provide different first, second, and third predetermined levels of absorption and attenuation of kinetic energy imparted to the hood assembly by objects upon impact therebetween throughout their respective regions.

* * * * *